(12) United States Patent  
Kato et al.

(10) Patent No.: US 6,988,539 B2  
(45) Date of Patent: Jan. 24, 2006

(54) HEAT EXCHANGER

(75) Inventors: Soichi Kato, Saitama (JP); Shoji Akiyama, Saitama (JP)

(73) Assignee: Zexel Valeo Climate Control Corporation, Saitama (JP)

(*) Notice: Subject to any disclaimer, the term of this patent is extended or adjusted under 35 U.S.C. 154(b) by 78 days.

(21) Appl. No.: 10/788,474

(22) Filed: Mar. 1, 2004

(65) Prior Publication Data

US 2004/0194931 A1 Oct. 7, 2004

Related U.S. Application Data

(63) Continuation-in-part of application No. 10/149,191, filed as application No. PCT/JP00/09345 on Dec. 27, 2000, now abandoned.

(30) Foreign Application Priority Data

Jan. 7, 2000 (JP) ............................................ 2000-1854

(51) Int. Cl.  
*F28F 1/00* (2006.01)

(52) U.S. Cl. .................... 165/133; 165/178; 165/179; 165/177

(58) Field of Classification Search ............... 165/134.1, 165/133, 177, 179, 178, 183; 29/890.053, 29/890.039, 890.054; 72/51, 52; 228/183, 228/186, 226, 225  
See application file for complete search history.

(56) References Cited

U.S. PATENT DOCUMENTS

| | | | | |
|---|---|---|---|---|
| 4,901,908 A | * | 2/1990 | Negura et al. | 228/183 |
| 5,172,476 A | * | 12/1992 | Joshi | 29/890.053 |
| 5,186,250 A | * | 2/1993 | Ouchi et al. | 165/177 |
| 5,500,288 A | * | 3/1996 | Isobe et al. | 428/469 |
| 5,579,837 A | * | 12/1996 | Yu et al. | 165/183 |
| 5,692,300 A | * | 12/1997 | Conn et al. | 29/890.053 |
| 5,956,846 A | * | 9/1999 | Ross et al. | 29/890.043 |
| 5,979,051 A | * | 11/1999 | Kato et al. | 29/890.049 |
| 6,129,143 A | * | 10/2000 | Hasegawa et al. | 165/133 |
| 6,129,147 A | * | 10/2000 | Dumetz et al. | 165/177 |

* cited by examiner

*Primary Examiner*—Tho v Duong  
(74) *Attorney, Agent, or Firm*—Takeuchi & Takeuchi (57) ABSTRACT

A heat exchanger comprising a heat exchange core (1) including a plurality of tubes (2) flowing a medium for heat exchange and a pair of tanks (4) to which ends of said tubes are connected, each tube formed by shaping a plate member (200) not clad with a row laminated brazing material and having a sacrifice layer (210) on an outer surface thereof and a plurality of recessed portions (203) formed on an outer surface of said sacrifice layer and filled with a brazing material (R).

6 Claims, 12 Drawing Sheets

HEAT EXCHANGER

CROSS REFERENCE TO RELATED APPLICATIONS

This is a continuation-in-part application of prior U.S. application Ser. No. 10/149,191 filed Jun. 10, 2002, now abandoned, which is a 371 of PCT/JP00/09345, filed Dec. 27, 2000.

BACKGROUND OF THE INVENTION

1. Technical Field

The present invention relates to a heat exchanger which is provided with tubes for flowing a medium and exchanges heat of the medium with heat conducted to the tubes.

2. Description of the Related Art

Generally, a heat exchanger such as a condenser, an evaporator, a radiator, a heater core or the like mounted on automobiles is provided with tubes for flowing a medium, fins fitted to the tubes and tanks which are connected to the tube ends and configured to perform the heat exchange of the medium with heat conducted to the tubes and the fins.

And, this type of heat exchanger is produced by assembling the tubes, fins and tanks which are made of aluminum or an aluminum alloy and heating the assembly in a furnace to be brazed into one body. A brazing material and flux necessary for the brazing are applied in advance to necessary portions of the respective members before heating.

As the tubes for the heat exchanger, those produced by shaping a plate-shaped material are known. And, these tubes are provided with beads which are shaped by bending a material, and the beads serve to improve a heat-exchange property and a pressure resistance of the tubes.

Besides, this heat exchanger has a sacrifice layer disposed on the outer surfaces of the tubes, so that the corrosion resistance of the tubes can be improved.

For example, the sacrifice layer which is formed of an Al—Zn based alloy is disposed on the core material of the tubes made of an Al—Mn based alloy, and electric potential of the tube core material becomes high with respect to the sacrifice layer. As a result, the corrosion resistance of the tubes is improved by a sacrificial anode effect.

When the tubes made of the plate-shaped material as described above are provided with beads, recessed portions are formed on the outer surfaces depending on the beads.

These recessed portions on the outer surfaces of the tubes make it difficult to connect the tubes and the tanks and the recessed portions readily gather dust and water, thus,they become a cause of advancing the corrosion of the tubes.

Especially, as described in Japanese Patent Laid-Open Publication No. HEI 4-20791, there are tubes in which the mutually opposed surfaces of the material at the beads are put together to eliminate the recessed portions of the outer surfaces. But, in practice, it is very hard to completely eliminate the recessed portions, and these tubes mostly have some recessed portions remaining on the outer surfaces.

When a brazing material is clad to the surface of the material which becomes the outer surface of the tube, the brazing material melted by heating accumulates in the recessed portions, so that the recessed portions can be filled with the brazing material. But, when the brazing material for filling the recessed portions is separately disposed on the tubes, there is a disadvantages that the production cost becomes very high.

Accordingly, in view of the above problem, it is an object of the present invention to provide a heat exchanger which can efficiently secure the corrosion resistance of the tubes and can be produced at a low cost.

SUMMARY OF THE INVENTION

The present invention is a heat exchanger which is provided with tubes for flowing a medium and tanks to which ends of the tubes are connected, performs heat exchange of the medium by heat conducted to the tubes, has the tubes and the tanks assembled to form a heat exchanger core, and has the heat exchanger core brazed into one body, wherein the tubes are formed by shaping a plate-shaped material, have beads which are formed by bending the material, and have a sacrifice layer disposed on the outer surfaces of the tubes; the heat exchanger core is provided with a brazing material for filling recessed portions on the outer surfaces of the tubes which are formed when the beads are formed; and the recessed portions on the outer surfaces of the tubes are filled with the brazing material which melts from the heat exchanger core at the time of integral brazing.

By configuring as described above, the corrosion resistance of the tubes is efficiently secured. Specifically, the recessed portions on the outer surfaces of the tubes tend to gather dust and water and become a cause of promoting corrosion of the tubes. But, the present invention provides the sacrifice layer on the outer surfaces of the tubes and recessed portions are filled with the brazing material, which melts from the heat exchanger core, into the recessed portions. Thus, the corrosion resistance of the tubes is improved securely. When the brazing material for filling the recessed portions is laminated on the plate-shaped material for forming the tubes, the production cost becomes very high. Therefore, the brazing material for filling the recessed portions is laminated on the heat exchanger core other than the tubes to save the cost. Alternatively, a necessary volume of the brazing material is disposed on the tube as a disposed brazing material.

The brazing material to be used for brazing the tubes, tanks, and fins into one body and filling the recessed portions is supplied from a row brazing material laminated on the tanks and/or the fins (laminated brazing material) and a paste, a stick, or a sheet disposed on the tubes, tanks, and/or fins (disposed brazing material).

PREFERRED EMBODIMENTS OF THE INVENTION

Embodiments of the present invention will be described in detail with reference to the accompanying drawings.

Figure 1:
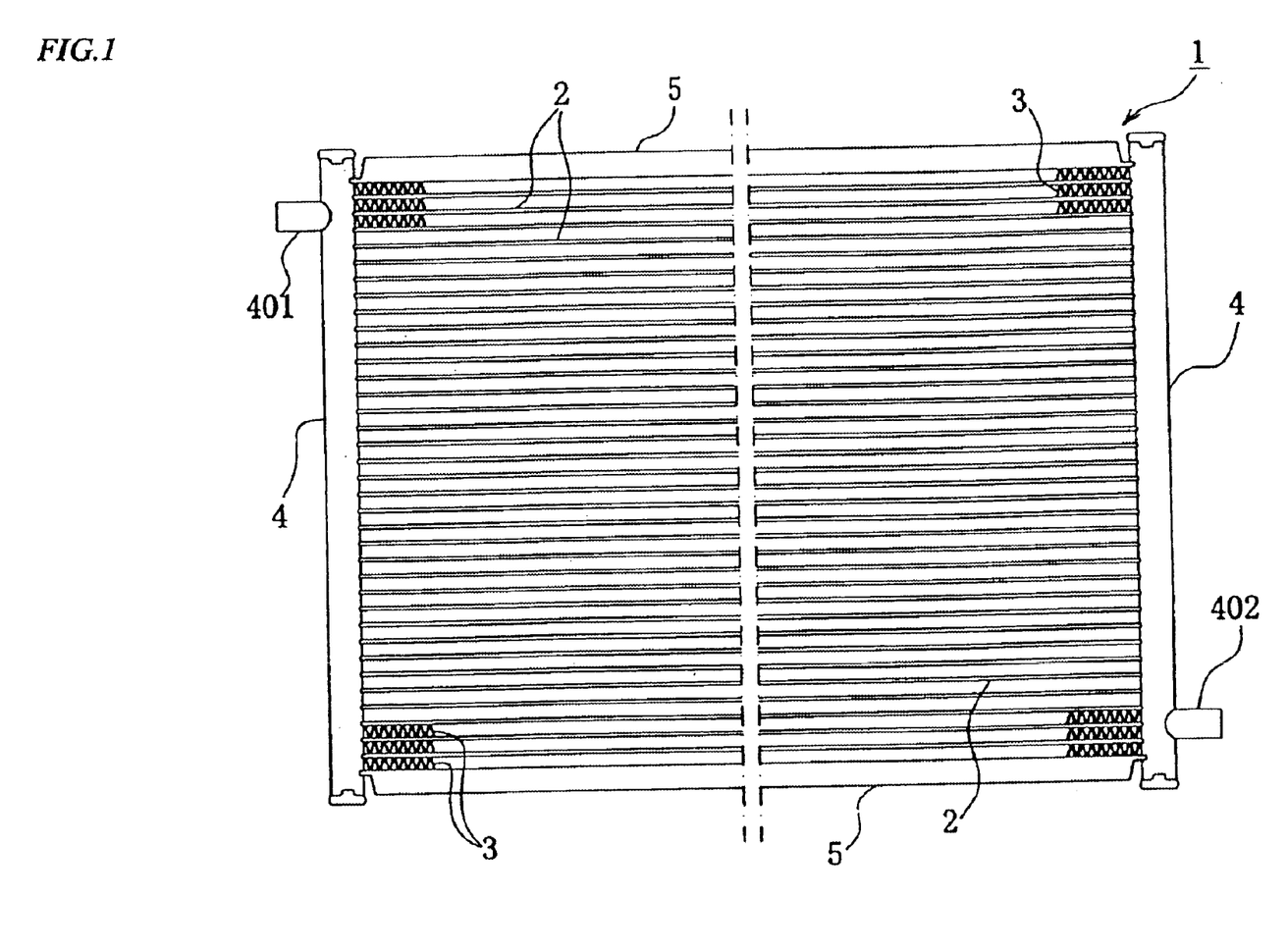
FIG. 1 is a front view showing a heat exchanger according to an embodiment of the present invention.
Figure 2:
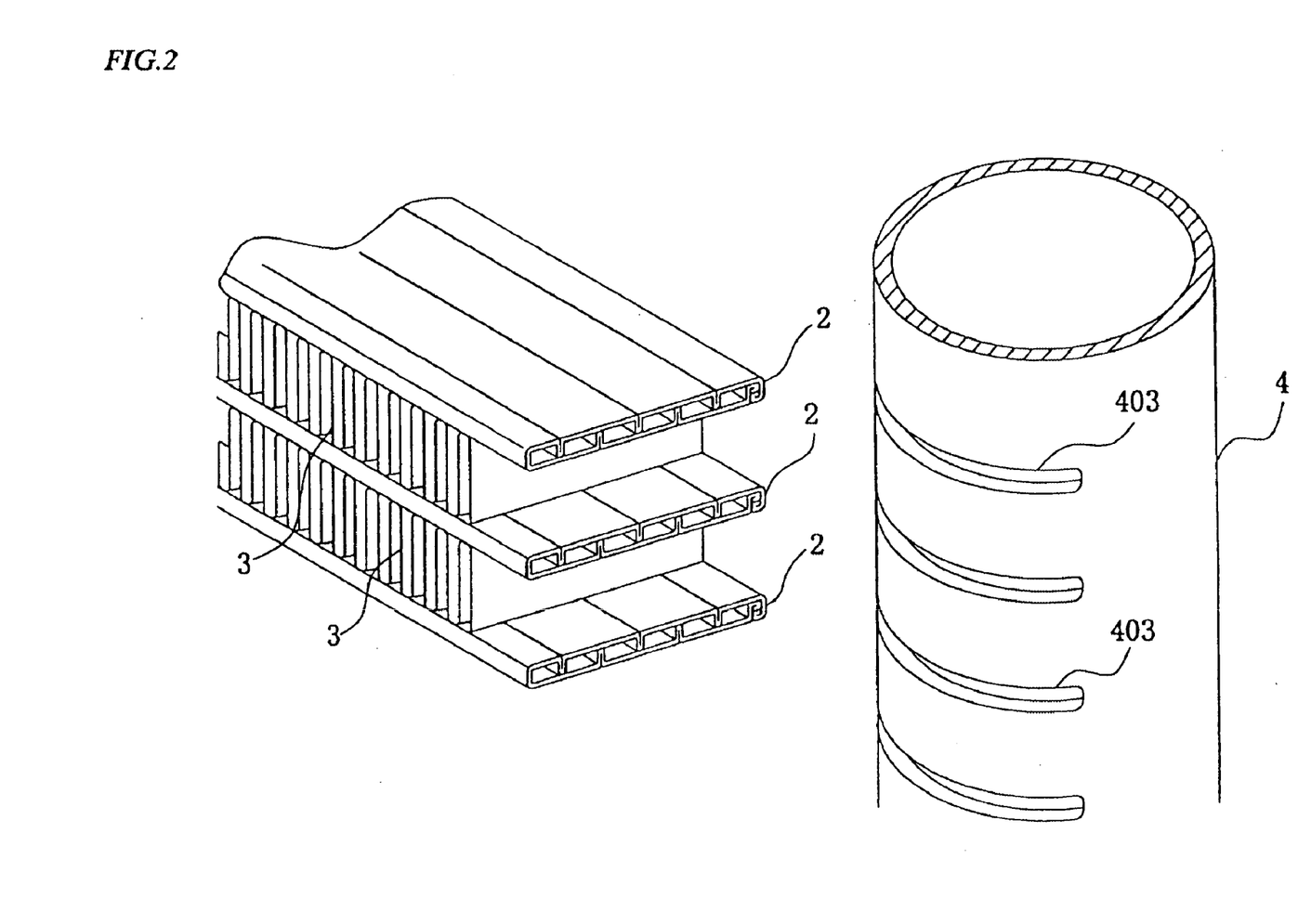
FIG. 2 is a perspective view showing tubes, fins and a tank according to the embodiment of the invention.

As shown in FIG. 1 and FIG. 2, a heat exchanger of this embodiment is a condenser of a refrigerating cycle for an in-car air conditioner mounted on automobiles, and has a heat exchanger core 1 configured by alternately stacking a plurality of tubes 2 and a plurality of fins 3 and connecting both ends of the tubes 2 to a pair of tanks 4.

The tanks 4 of this embodiment are cylindrical members which are provided with an inlet joint 401 and an outlet joint 402 for connecting an external pipe and holes 403 into which the ends of the tubes 2 are inserted for connection, and have their inside portioned at a prescribed width.

A medium is taken-in through the inlet joint 401, passing through the tubes 2 while heat exchanging with heat conducted to the tubes 2 and the fins 3 and discharged through the outlet joint 402.

And, side plates 5, which are reinforcing members, are respectively disposed on the top and bottom of a layer of the tubes 2 and the fins 3. Both ends of the side plates 5 are supported by the tanks 4.

The tubes 2, the fins 3, the tanks 4 and the side plates 5 are assembled by a jig, and heated in a furnace to be brazed into one body. A brazing material and flux are previously disposed at necessary portions of these members.

Figure 3:
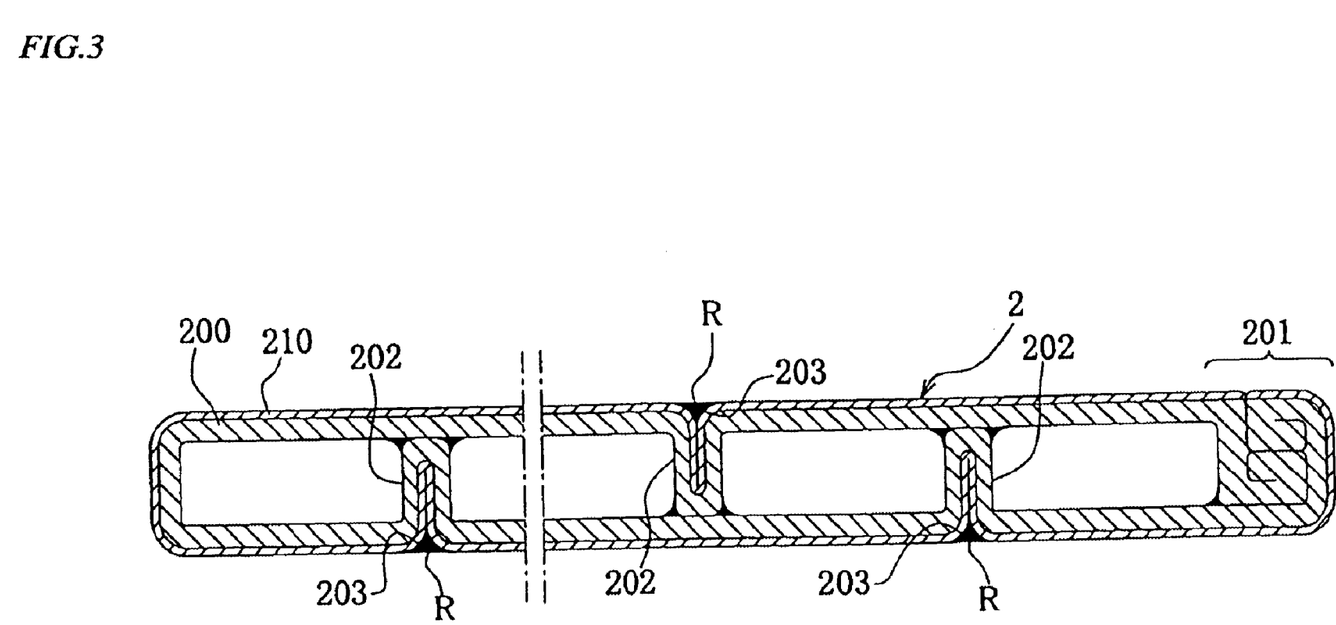
FIG. 3 is a sectional diagram showing a tube according to the embodiment of the invention.

As shown in FIG. 3, the tubes 2 of this embodiment have a flat shape formed by rolling a plate-shaped material 200 made of an aluminum alloy so to have a joined portion 201 which is formed by connecting the ends in a breadth direction of the material 200 and a plurality of beads 202 which are formed by bending the material 200 inwardly, and the joined portion 201, the tops of the beads 202 and the inner opposed portions are brazed. And, a sacrifice layer 210 is disposed on the surface of the material 200 which will become the outer surfaces of the tubes 2.

The beads 202 improve the heat-exchange property and pressure resistance of the tubes 2, and the sacrifice layer 210 improves the corrosion resistance of the tubes 2.

Figure 4:
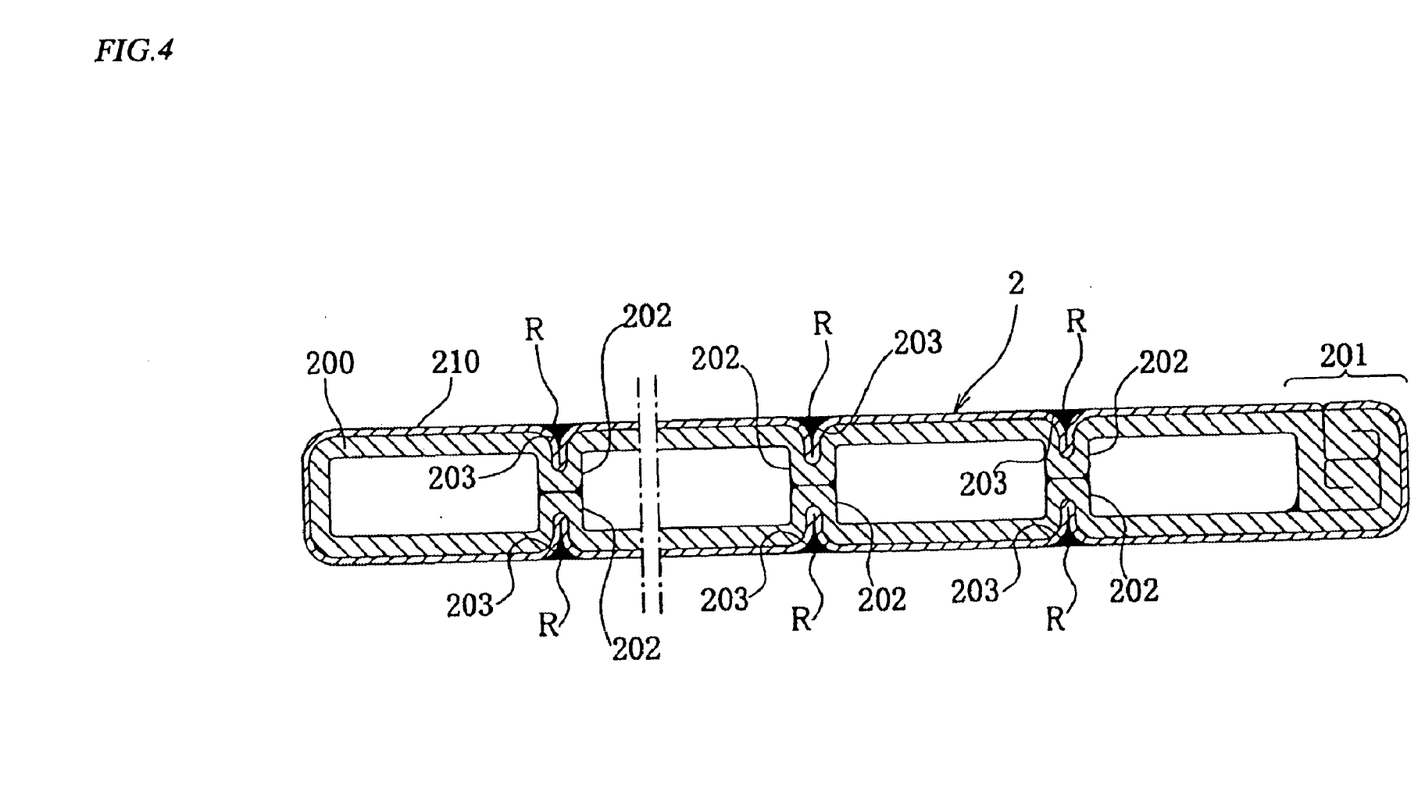
FIG. 4 is a sectional diagram showing a tube according to an embodiment of the invention.

The beads 202 may be formed to braze the opposed tops mutually as shown in FIG. 4.

Besides, a brazing material R fills the recessed portions 203 on the outer surfaces of the tubes 2 formed according to the beads 202.

Figure 5:
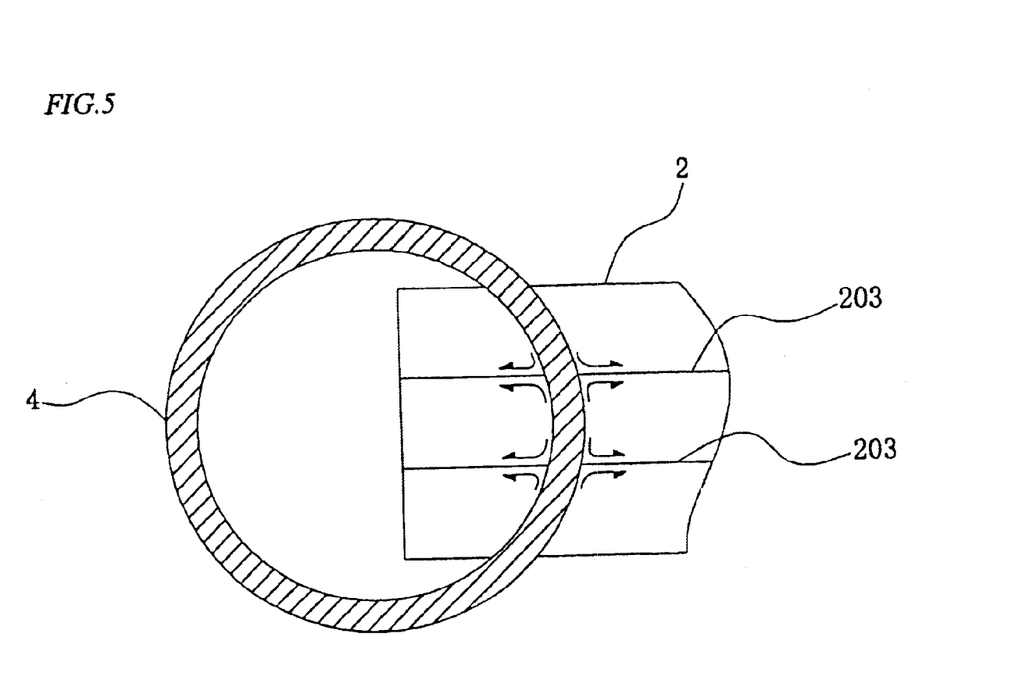
FIG. 5 is a top view of the tube and tank, showing a flow of a melted brazing material provided on the tanks.
Figure 6:
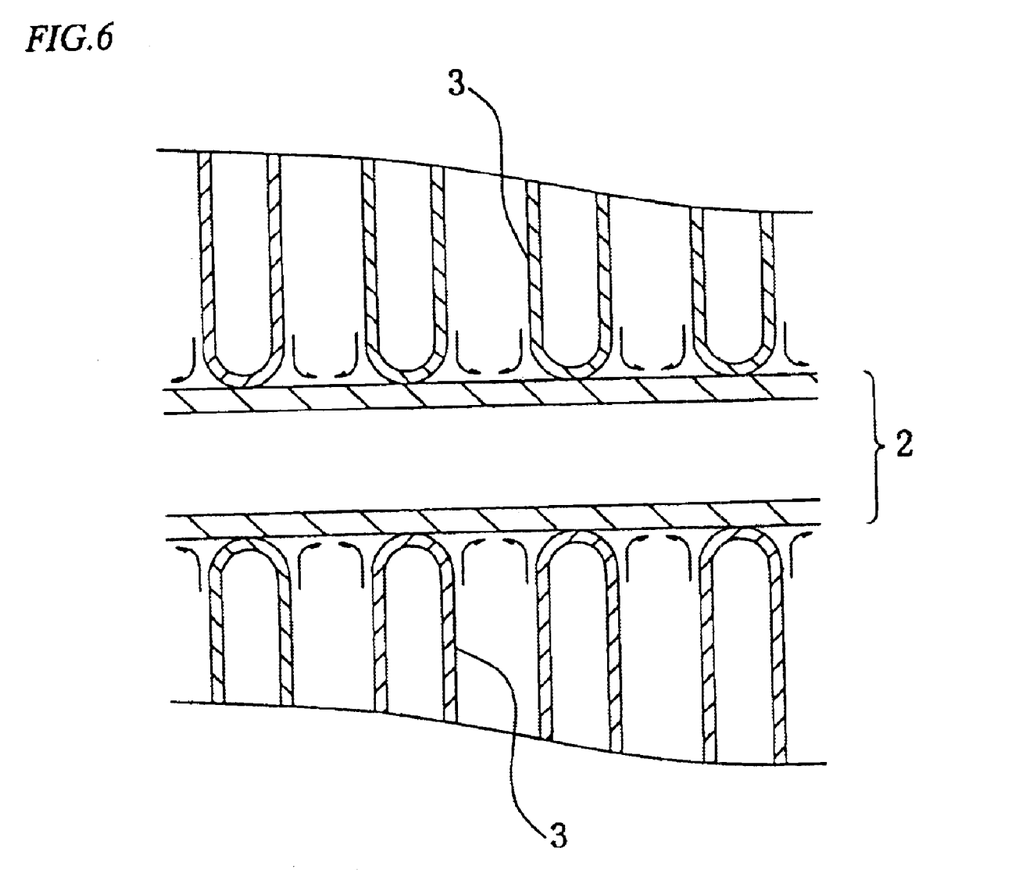
FIG. 6 is a front view of the tube and fins, showing a flow of a melted brazing material provided on the fins.
Figure 7A:
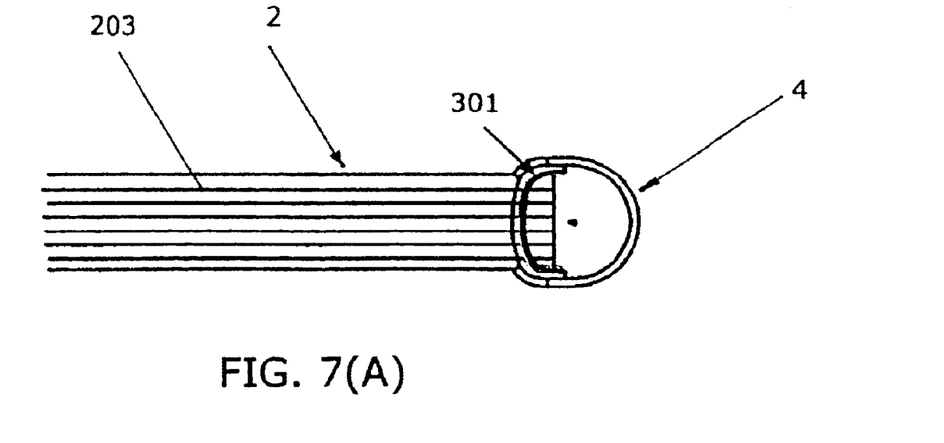
FIGS. 7(A) and (B) are top and front views, respectively, of part of the heat exchanger, showing a laminated brazing material provided on part of inside surface of the tank.
Figure 7B:
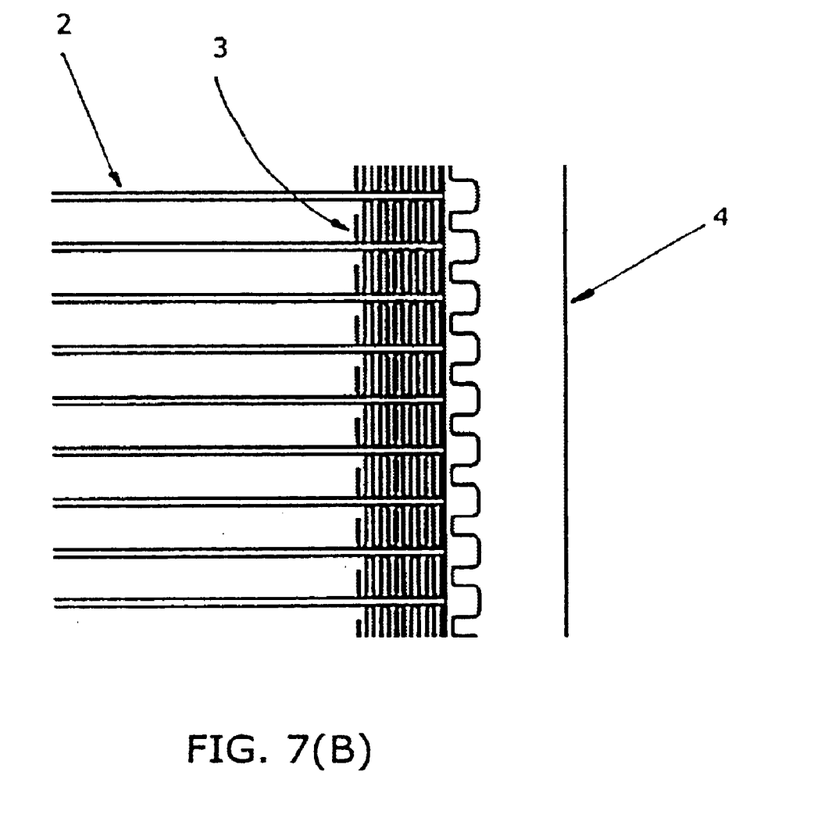
Figure 8A:
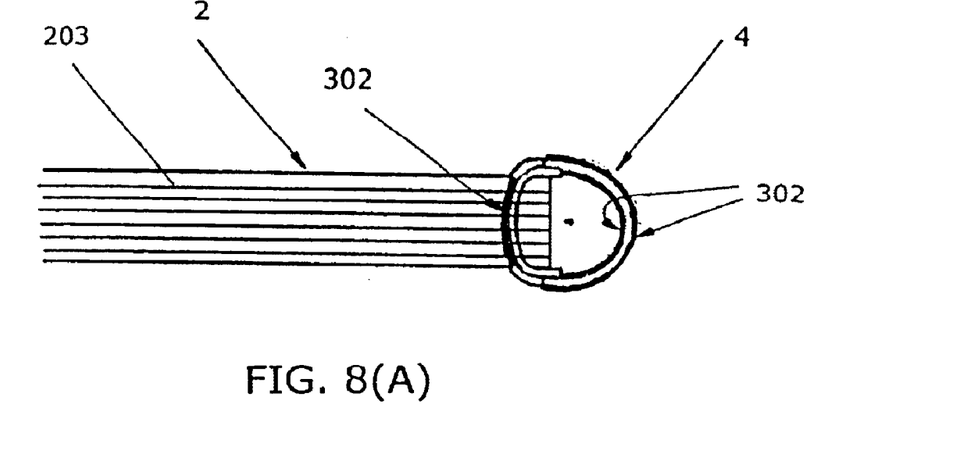
FIGS. 8(A) and (B) are top and front views, respectively, of part of the heat exchanger, showing a laminated brazing material provided on an inside and outside surfaces of the tank except for part of the inside surface of the tank.
Figure 8B:
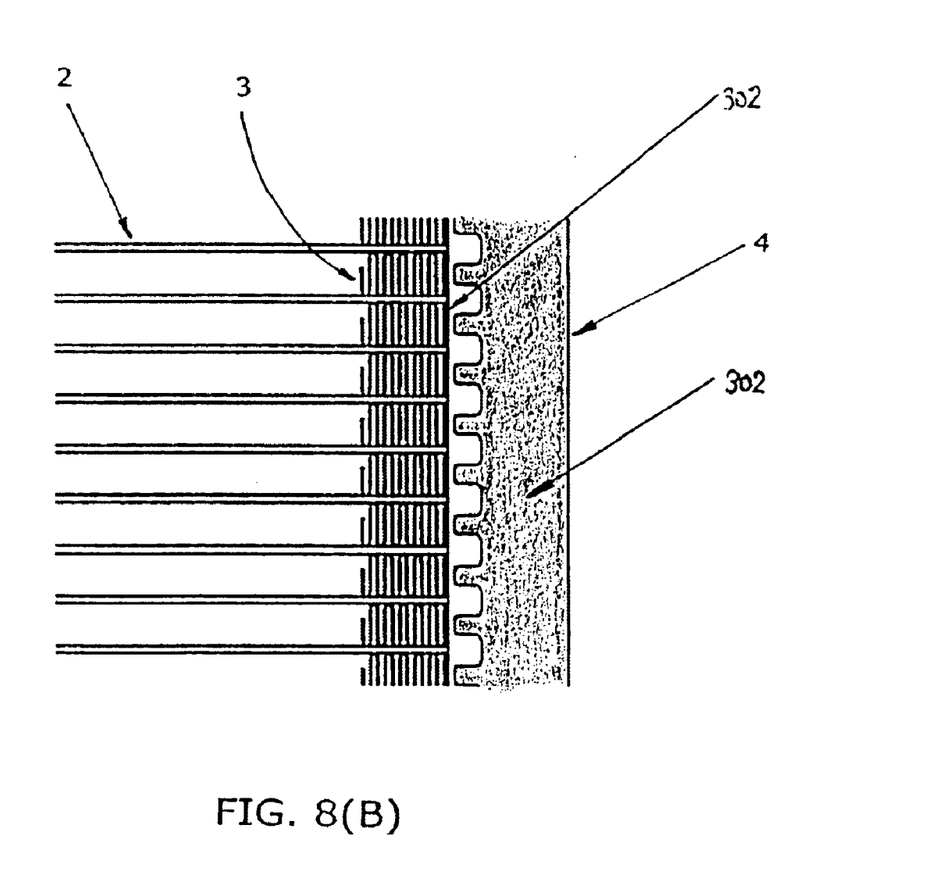
Figure 9A:
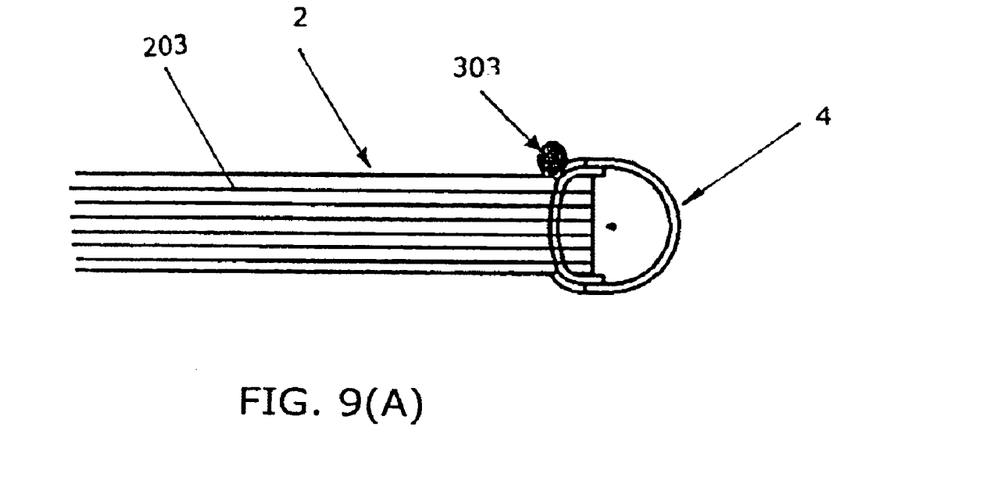
FIGS. 9(A) and (B) are top and front views, respectively, of part of the heat exchanger, showing a stick brazing material disposed on an edge of the tank.
Figure 9B:
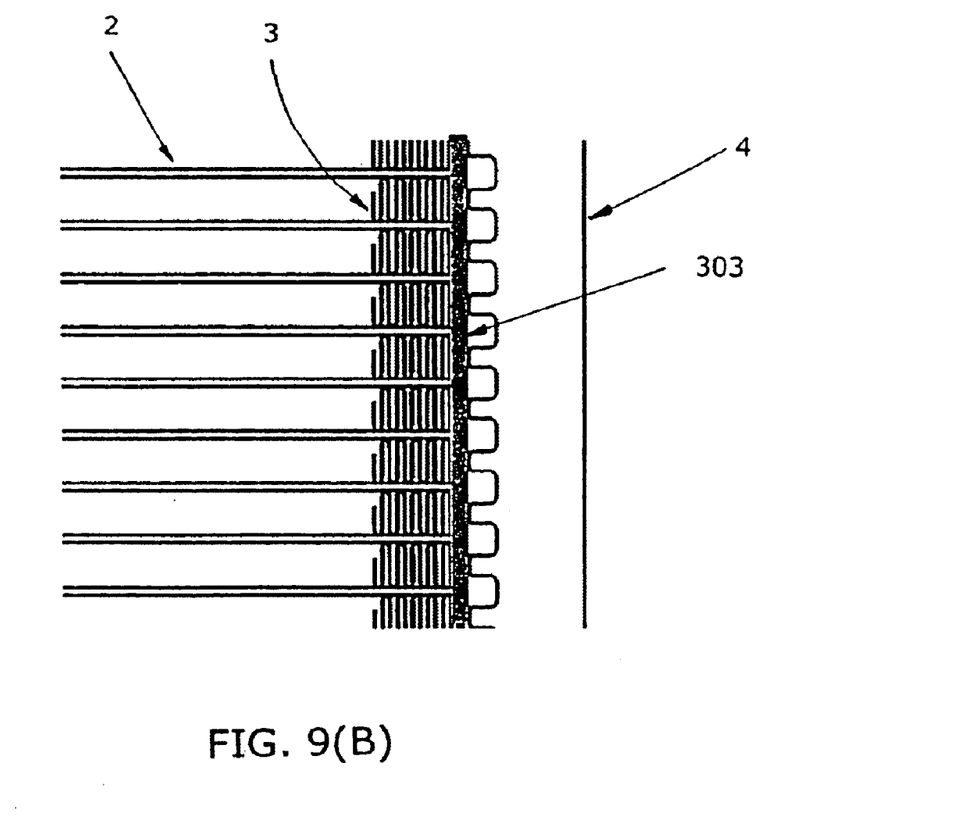

For the source of the brazing material R, various forms are considered. For example, FIGS. 5 and 6 show flows of the row laminated brazing material provided at the tanks 4 and fins 3, respectively, which is melted at the time of brazing of the heat exchanger core.

Where the row brazing material is placed will be described. According to the invention, the row brazing material to braze the tubes, tanks, and fins into one body and fill the recessed portions 203 is laminated on the tanks 4 or fins 3. In FIG. 7, a layer of the row brazing material 301 is laminated on part of the inside surface of the tank 4. In FIG. 8, a layer of the row brazing material 302 is laminated on almost whole part of the outside surface and part of the inside surface of the tank 4. FIG. 6 shows that the row brazing material laminated on the surfaces of the fins 3 flows to the surfaces of the tubes 2. The row brazing material is not laminated on the plate-shaped material 200 for the tubes 2. The first advantage of the non-use of the row laminated brazing material on the plate-shaped material 200 is to reduce the material cost. The second advantage is that the thickness of the plate-shaped material 200 is the same before and after the brazing of the exchanger core so that secure brazing is possible. The third advantage is that sacrifice layer is not adversely influenced by melting of the row laminated brazing material.

Figure 10A:
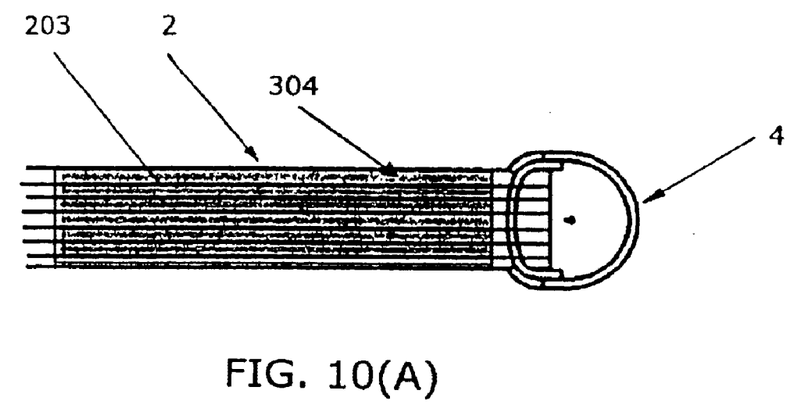
FIGS. 10(A) and (B) are top and front views, respectively, of part of the heat exchanger, showing a paste brazing material disposed on top and bottom surfaces of the tank.
Figure 10B:
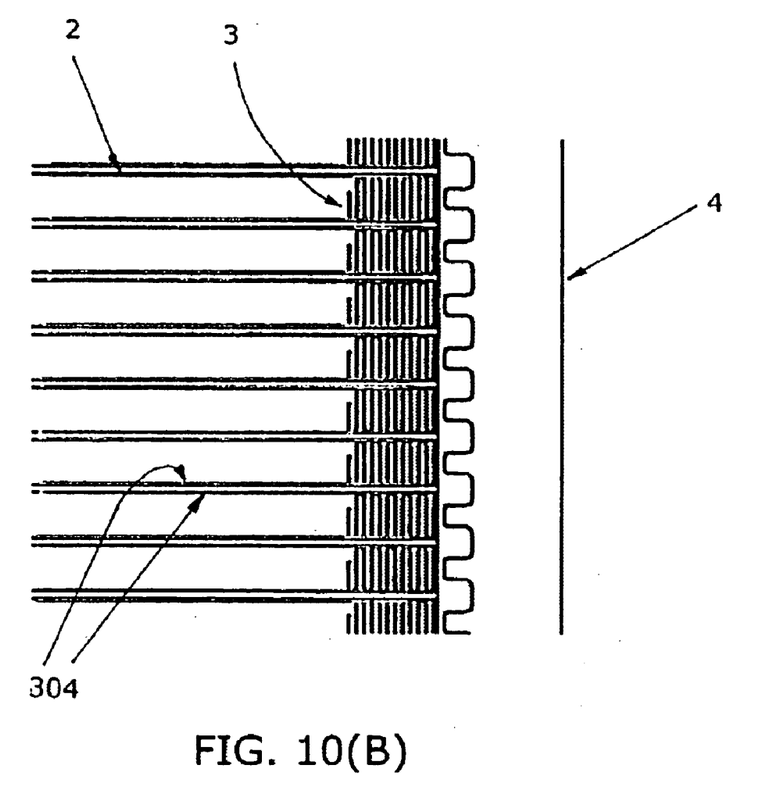
Figure 11A:
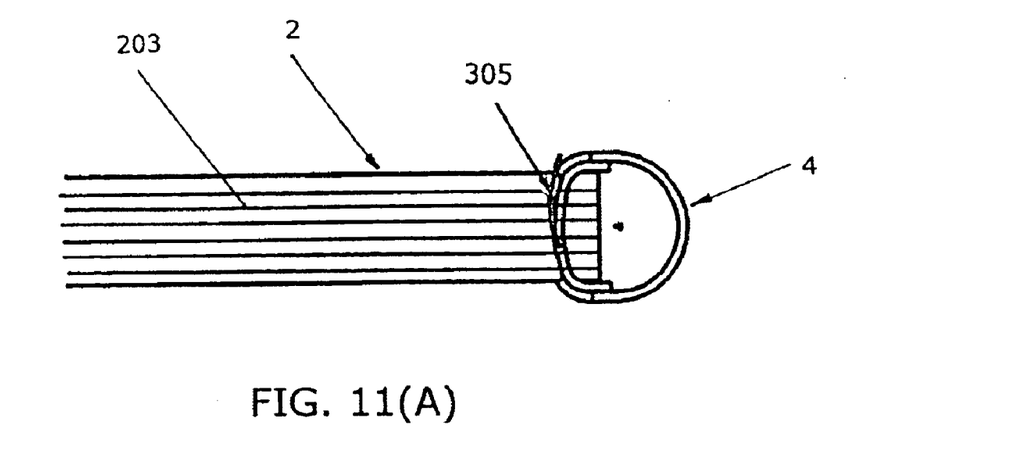
FIGS. 11(A) and (B) are top and front views, respectively, of part of the heat exchanger, showing a sheet brazing material disposed to a junction area of an outside surface of the tank between the tank and tubes.
Figure 11B:
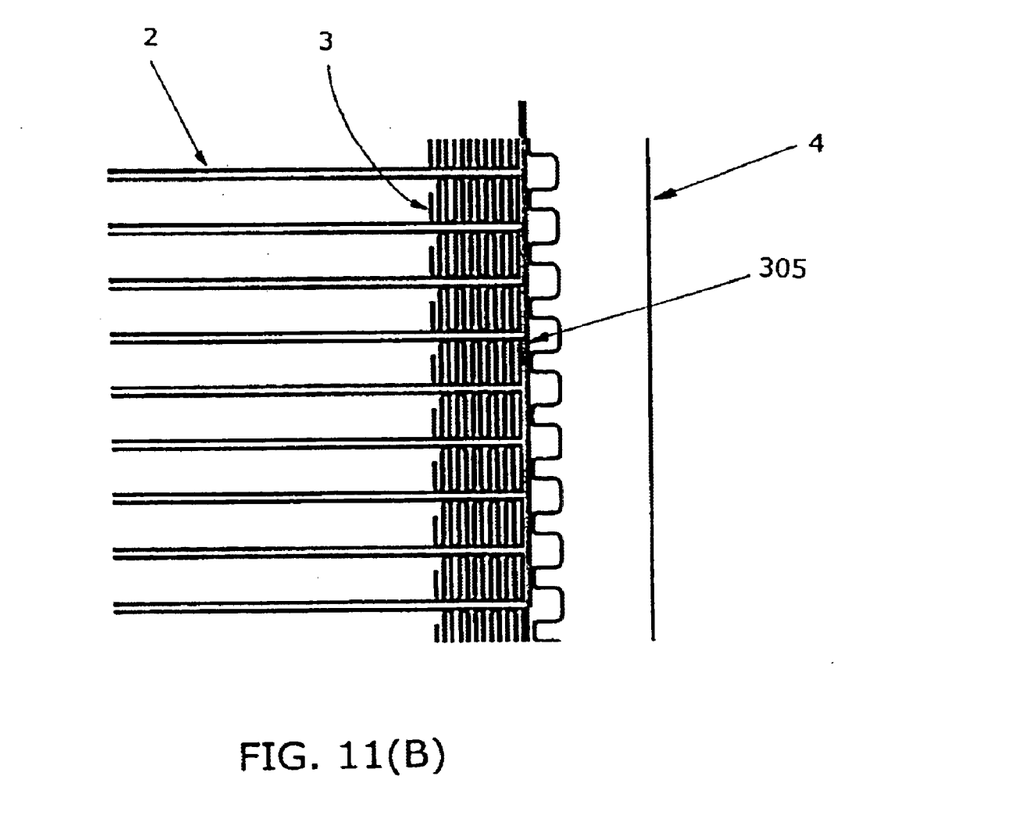
Figure 12A:
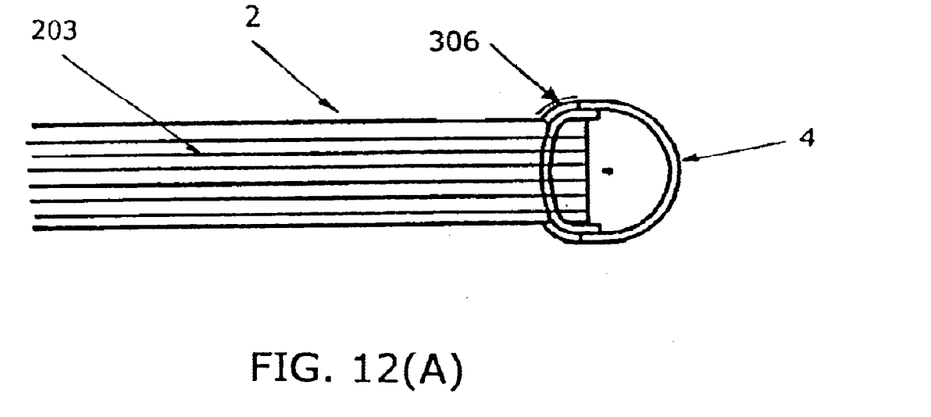
FIGS. 12(A) and (B) are top and front views, respectively, of part of the heat exchanger, showing a paste brazing material disposed on a claw of the tank.
Figure 12B:
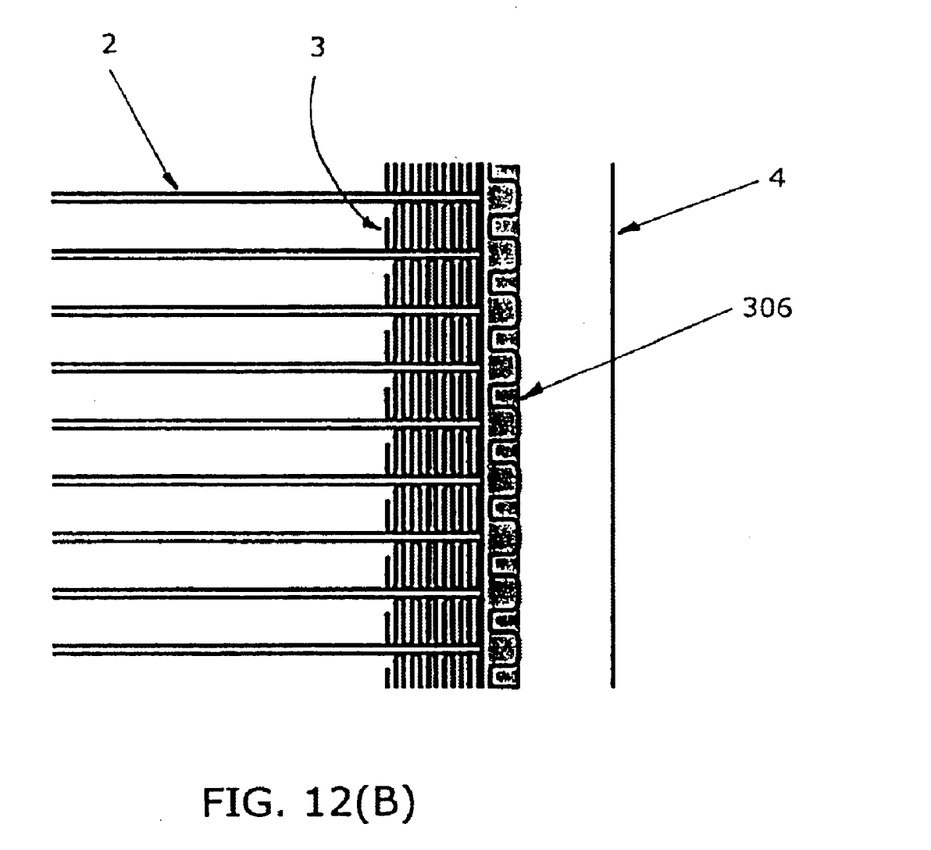

When appropriate, the row disposed brazing material can be used instead of the row laminated brazing material, or when the row laminated brazing material is not sufficient to fill the recessed portions 203 completely, the row disposed brazing material is provided at appropriate positions of the heat exchanger core to supplement the row laminated brazing material. For example, in FIG. 9, the row disposed brazing material 303 having a shape of a cylindrical stick is provided at an edge of the tank 4 communicating to the tubes 2. In FIG. 10, a paste brazing material 304 is coated on the surfaces of the tubes 2 upon formation of the tubes 2. In FIG. 11, the disposed sheet brazing material 305 having a shape of a sheet is attached to a junction of the outside surface of the tank 4 into which the tubes 2 are inserted. In FIG. 12, a paste brazing material 306 is coated on a position of a claw of the tank 4. These row disposed brazing materials are provided before the heat exchanger assembly is put in a heating furnace.

The heat exchanger core with the row laminated or disposed brazing material is laid on its side so that the longitudinal side of the tanks 4 is on the level. Then, the heat exchanger core is put in the heating furnace.

Thus, the entry of dust and water into the recessed portions 203 can be prevented by filling the recessed portions 203 with the brazing material R, and the corrosion resistance of the tubes 2 can be improved. And, the tubes 2 can be reinforced by the brazing material R, and the pressure resistance and strength of the tubes 2 can also be improved.

In this embodiment, it is configured to fill all the recessed portions 203 on the outer surfaces of the tubes 2 with the brazing material R, but the brazing material R may partly fill the recessed portion 203 around the tops of the fins 3, around the holes 403 of the tanks 4, or the like.

The row disposed brazing material may be disposed as the brazing material on the outer surface of the tubes 2 to fill the recessed portions 203 with row the brazing material. Specifically, it may be configured to fill the recessed portions 203 with the row disposed brazing material disposed on the tubes 2 in addition to the row laminated brazing material melting from the fins 3 and the tanks 4.

In the heat exchanger of this embodiment as described above, the tubes are formed by shaping the plate-shaped material and have the beads which are formed by bending the material, the sacrifice layer is disposed on the outer surfaces, and the row laminated brazing material which melts from the fins and the tanks at the time of brazing fills the recessed portions on the outer surfaces of the tubes which are formed according to the beads. Thus, the corrosion resistance of the tubes can be secured efficiently.

In other words, the recessed portions on the outer surface of the tubes tend to gather dust and water and become a cause of promoting the corrosion of the tubes. But, the present invention disposes the sacrifice layer on the outer surfaces of the tubes and the row brazing material, which melts from the tanks and the fins, enters into and fills the recessed portions, so that the corrosion resistance of the tubes can be improved without fail.

And, the tubes of this embodiment are formed by shaping the plate-shaped material and have the beads which are formed by bending the material, and the sacrifice layer is disposed on the outer surfaces of the tubes. The heat exchanger is configured by disposing the row disposed brazing material on the tubes at the time of brazing and the row disposed brazing material fills the recessed portions on the outer surfaces of the tubes which are formed according to the beads. This configuration secures the corrosion resistance of the tubes efficiently.

In other words, the corrosion resistance of the tubes can be improved without fail by filling the recessed portions with the row disposed brazing material disposed on the tubes.

In the specific examples shown in the drawings, the tubes 2 and the plurality of fins 3 are alternately stacked, and both ends of the tubes are respectively connected to the pair of tanks 4 to configure the heat exchanger core 1. But, the present invention is not limited to it and can also be applied to, for example, a heat exchanger core not using fins and a heat exchanger core of another embodiment.

The present invention is a heat exchanger which can have the corrosion resistance of the tubes secured efficiently and can be suitably used as a heat exchanger for a condenser, an evaporator, a radiator, a heater core and the like mounted on automobiles.

What is claimed is:

1. A heat exchanger comprising:
    a plurality of tubes through which a medium flows for heat exchange and
    a pair of tanks to which ends of said tubes are connected to form a heat exchanger core,
    each tube being formed by shaping a plate member and having a sacrifice layer as an outer surface thereof and a plurality of recessed portions formed thereon and filled with a brazing material to join sacrifice outer surfaces of said recessed portions, thereby reinforcing said each tube, wherein said recessed portions have a constant sectional area along an entire length of said each tube.

2. The heat exchanger according to claim 1, wherein said brazing material in said recessed portions is supplied from a row laminated brazing material provided on said tanks when said tubes and tanks are brazed into said heat exchanger core.

3. The heat exchanger according to claim 1, wherein said brazing material in said recessed portions is supplied from a row disposed brazing material provided on at least one of said tubes and tanks when said tubes and tanks are brazed into said heat exchanger core.

4. The heat exchanger according to claim 1, wherein said heat exchanger core further includes a plurality of fins provided between said tubes and said brazing material in said recessed portions which is supplied from a row laminated or disposed brazing material provided on said fins when said tubes, tanks, and fins are brazed into said heat exchanger core.

5. A heat exchanger comprising:
    a plurality of tubes through which a medium flows for heat exchange and
    a pair of tanks to which ends of said tubes are connected,
    each tube being formed by shaping a plate member that is not clad with a brazing material and having a sacrifice layer as an outer surface thereof and a plurality of recessed portions formed thereon and filled with a brazing material to join said sacrifice outer surfaces of said recessed portions, thereby reinforcing said each tube, and wherein said recessed portions have a constant sectional area along an entire length of said each tube.

6. The heat exchanger according to claim 1, wherein said sacrifice layer is made of an aluminum zinc alloy.

* * * * *